July 28, 1931.　　W. SCHROEDER　　1,816,235
FISHING APPLIANCE
Filed Sept. 20, 1930

W. SCHROEDER Inventor

By Merrill M. Blackburn,
Attorney

Patented July 28, 1931

1,816,235

UNITED STATES PATENT OFFICE

WALTER SCHROEDER, OF DAVENPORT, IOWA

FISHING APPLIANCE

Application filed September 20, 1930. Serial No. 483,168.

It is a common practice among fishermen to attach a float or bobber to a fish line at a greater or less distance from the fish hook to suspend the latter at any desired distance below the surface of the water and to rely upon being quick enough in pulling the pole to succeed in causing the hook to engage the mouth of the fish and hold him. The present invention pertains to that class of fishing apparatus and among the objects of this invention are to provide an improved device for suspending the hook at the desired height in the water; to provide a device which will be certain in its action and which will exert a quick pull upon the fish hook; to provide a device which is easily set for operation and which will be certain to be released when the hook is pulled; and such further objects, advantages and capabilities as will hereafter appear and as are inherent in the construction disclosed herein. My invention further resides in the combination, construction and arrangement of parts illustrated in the accompanying drawings, and, while I have shown therein what is considered the preferred embodiment of this construction, I desire the same to be understood as illustrative only and not to be interpreted in a limiting sense.

Figure 1:
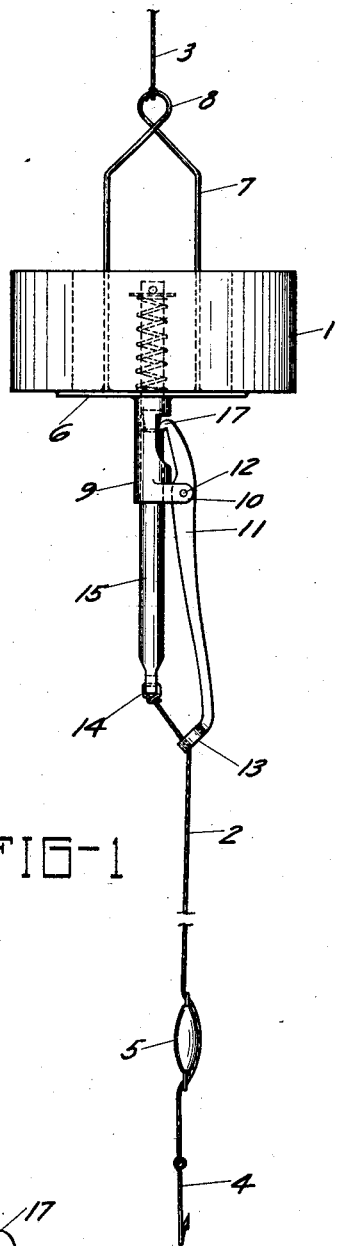
Figure 2:
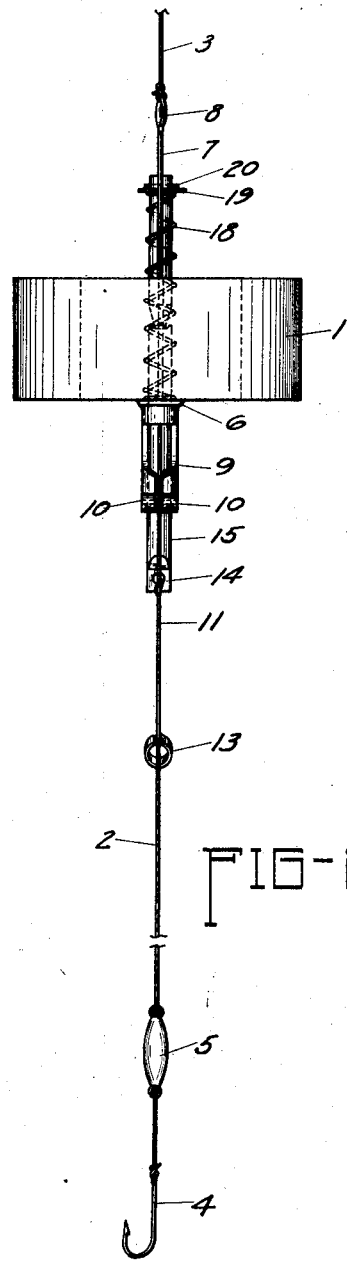
Figure 3:
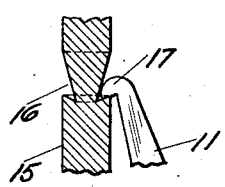

In the drawings annexed hereto and forming a part hereof, Figs. 1 and 2 are elevations, at right angles to each other, of my present construction and Fig. 3 is a fragmentary longitudinal section showing more in detail the latching means for the spring actuated plunger.

Reference will now be made in greater detail to the annexed drawings in which the float is indicated by the numeral 1, the hook suspending line by the numeral 2 and the main fish line by the numeral 3. The customary hook is denoted by the numeral 4 and the sinker by the numeral 5. The float 1 may be of hollow metal construction or of cork or other suitable light material. This float is hollow to permit reciprocation of the plunger which causes actuation of the fish hook. A suitable supporting plate 6 is secured to the under surface of the float in any manner suitable to the material used. A suspending bail 7, illustrated as having an eye 8 is shown as being connected to the plate 6 and furnishes means whereby the float may be attached to the fish line 3. Preferably integrally connected with this plate 6 is a sleeve 9, provided with a pair of ears 10 between which is pivoted the trigger 11, as indicated at 12. This trigger has an eye 13 at its lower extremity through which extends the hook suspending line 2 whose upper end is secured at 14 to the plunger 15.

The plunger 15 has an easy sliding fit in the sleeve 9 and is reduced as indicated at 16 to receive the hook 17 of the trigger 11. As illustrated in Fig. 1, the hook is in engagement with the lower shoulder of the notch 16 and prevents the plunger from sliding upwardly under the influence of the spring 18, one end of which rests on the plate 6 and the other end underneath the washer 19 which is held in place on the plunger in any desired manner, it being shown as being held by a pin 20. It will be understood that the notch 16 may have various shapes, but it is preferred to have the same extend all the way around the plunger 15 so that if the latter turns in the sleeve 9 the hook 17 will not be prevented from engaging in the notch. If desired, the upper end of the notch 16 may be cut in similarly to the lower end and the shoulder at the upper end may extend at a right angle to the axis of this plunger or may be inclined either upwardly or downwardly. This is a mere matter of detail coming well within the scope of my present invention.

It will be understood that Fig. 1 shows the device when set and ready to be placed in the water. Fig. 2 shows the same device with the plunger in released position.

It is of course understood that the specific description of structure set forth above may be departed from without departing from the spirit of my invention as set forth in this specification and the appended claims.

Having now described my invention, I claim:

1. In a fishing appliance, a float to suspend a fish hook in the water, said float having an opening therein for reception of a reciprocable plunger, supporting means secured to the float and having a reciprocable plunger extending therethrough and into the float, resilient means actuating the plunger with relation to the supporting means and float, said plunger having a depression around its body to receive a trigger, a trigger pivotally mounted upon the supporting means and having a nose to engage the depression in the plunger, said trigger having an eye for reception of a flexible fish hook suspending means, and a flexible fish hook suspending means extending through the eye and attached to the plunger.

2. A structure as defined in claim 1 in which the lower end of the trigger is offset laterally with relation to the plunger so that a downward pull on the fish hook will cause the trigger to swing laterally towards the plunger at its lower end.

3. In a fishing appliance of the character described comprising a float having an opening extending axially therethrough, substantially centrally, an attaching plate secured to said float and having a sleeve secured thereto, the plate having an opening therein aligning with the opening of the sleeve, a bail extending through the float and attached to the plate, said bail being adapted to be attached to a fish line, a substantially cylindrical plunger extending through said sleeve and having a fish hook connected to its lower end to be actuated by the plunger, a spring surrounding said plunger and resting at one end against said plate and at its other end being connected to the plunger for actuation thereof, said plunger having a circumferential depression in its upper portion for reception of a latching device, a latching device having a nose at one end and an eye at its opposite end, said latching device being pivotally mounted upon said sleeve, the nose of the latching device engaging the depression in the plunger to latch the same in position for use, the eye end of the latching device being offset laterally with relation to the plunger and having the suspending means for the fish hook passing therethrough to be connected to the plunger.

In witness whereof, I hereunto subscribe my name to this specification.

WALTER SCHROEDER.